United States Patent [19]

Lyon

[11] 4,360,368
[45] Nov. 23, 1982

[54] AIR-CONDITIONER EMPLOYING THE EVAPORATION OF WATER FOR A CAB OF A MACHINE OR VEHICLE

[76] Inventor: Roland Lyon, Couture sur Loir, 41800 Montoire, France

[21] Appl. No.: 197,324

[22] Filed: Oct. 15, 1980

[30] Foreign Application Priority Data

Oct. 18, 1979 [FR] France ............................ 79 26112

[51] Int. Cl.³ .............................................. B01F 3/04
[52] U.S. Cl. ...................................... 55/259; 62/314;
62/DIG. 16; 98/2.11; 98/2.14; 261/30;
261/115; 261/118; 261/DIG. 4
[58] Field of Search .................. 261/30, 118, DIG. 3,
261/DIG. 4, DIG. 15, 115; 98/2.11, 2.14, 2.15,
12, 30; 62/314, DIG. 16; 55/259

[56] References Cited

U.S. PATENT DOCUMENTS

| | | | |
|---|---|---|---|
| 816,371 | 3/1906 | Platz | 261/DIG. 3 |
| 2,152,251 | 3/1939 | Gay | 62/314 X |
| 2,493,141 | 1/1950 | Henney | 62/314 X |
| 2,796,014 | 6/1957 | Montgomery et al. | 62/314 X |
| 2,817,960 | 12/1957 | Lustwerk et al. | 62/314 X |
| 2,983,212 | 5/1961 | Poole | 98/2.11 |
| 3,637,195 | 1/1972 | Blazer et al. | 261/30 |
| 3,686,833 | 8/1972 | Rush | 55/259 X |
| 3,978,174 | 8/1976 | Peer | 261/DIG. 4 |

Primary Examiner—Richard L. Chiesa
Attorney, Agent, or Firm—Wenderoth, Lind & Ponack

[57] ABSTRACT

The sealed, compact air-conditioner employs the evaporation of water and permits the lowering of the ambient temperature in cabs of machines or vehicles with no compressor or refrigerating circuit being required.

It comprises a turbo-fan unit directly mounted against an evaporation chamber. Inside the latter, a box facing the air inlets conditions the air distributed toward water injection nozzles and ensures the seal on the upstream side of the chamber. On the opposite side, the outlet for the humidified fresh air is disposed in the upper part and is preceded by a droplet-separating medium. The evaporation chamber, associated with the deflector, constitutes a water recovery pan. It is continuously drained by a drain located in the lowermost point thereof.

The air-conditioner may be employed for the air-conditioning of agricultural, public works, handling, or cross-country machines or vehicles, such as tractors, harvester-threshers, shovellors or loaders.

16 Claims, 11 Drawing Figures

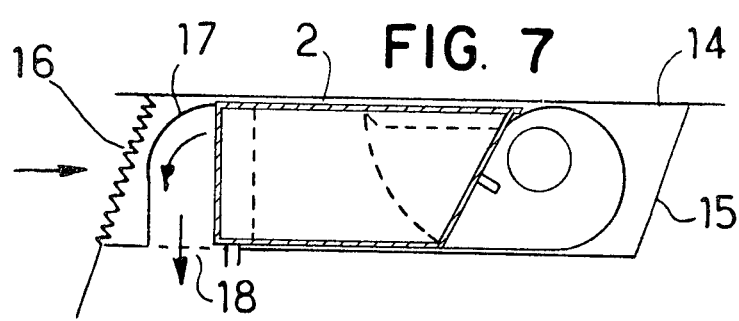
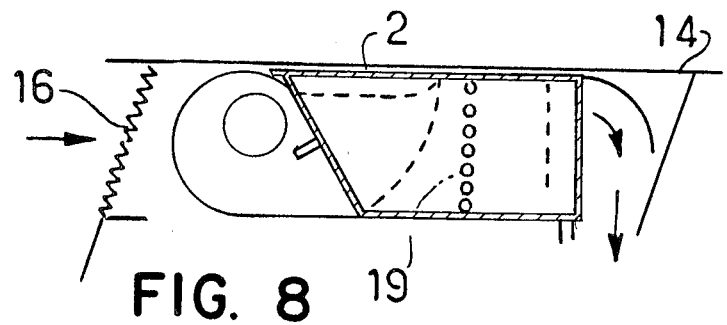
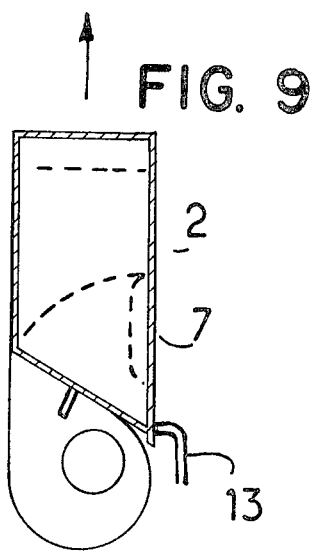
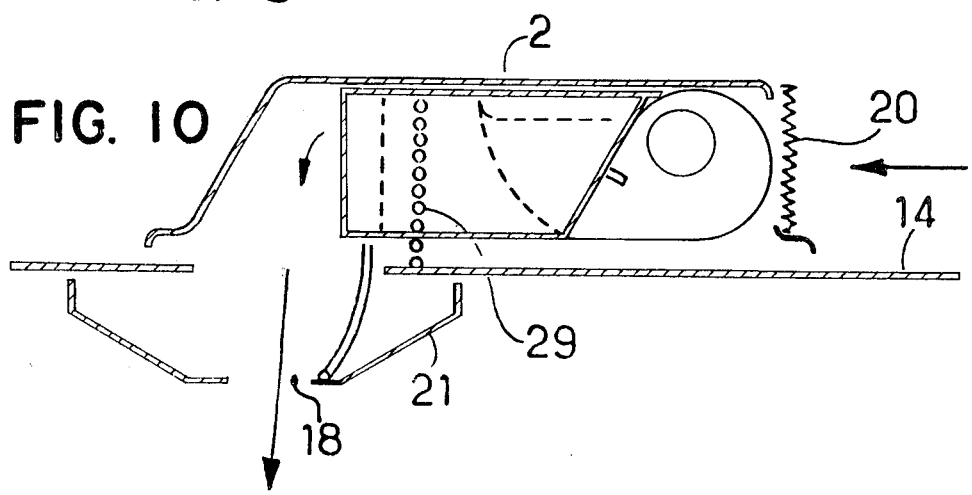
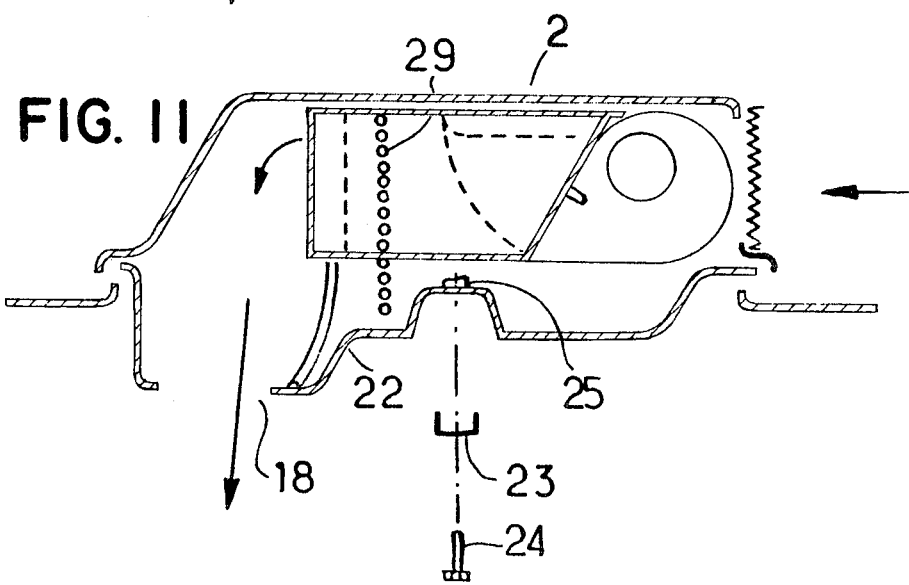

AIR-CONDITIONER EMPLOYING THE EVAPORATION OF WATER FOR A CAB OF A MACHINE OR VEHICLE

The present invention relates to air-conditioners of the type employing the evaporation of water and permitting the lowering of the temperature inside machine or vehicle cabs.

Known devices of this type usually comprise an annular evaporation chamber centered on a vertical axis and carrying, on one hand, a fan for drawing in the outside air which thus passes radially through the chamber and, on the other hand, a rotary disc which maintains a water mist in this chamber.

FIG. 1 of the accompanying drawings diagrammatically represents an air-conditioner of this type in the position of use on the roof of a cab.

An opening cut in the roof 1 of the cab ensures communication between the air-conditioner 2, which is mounted on the roof, and an air diffusing bracket 3 which is suspended in corresponding position inside the cab. The air drawn in from the exterior passes in succession through a stage 4 having dry filters, a cylindrical wet filter 5, and an annular chamber 6 in which a water mist is maintained, rids itself of its water droplets by passing through a cylindrical second wet filter 7, and is pumped inside the cab from which it issues by way of the bracket 3. An electric motor 8 having a double output shaft drives, on one hand, a fan 9 which produces a movement of the air, and, on the other hand, a disc 10 which serves to centrifugally pulverize water that it receives from a pipe located thereabove. The water supply (not shown) mainly comprises a water tank and a small circulating pump. The water which trickles in the wet filters 5 and 7 and which is condensed in the bottom of the annular chamber 6, is recovered in a pan 11. The latter comprises a lateral drain for the water return pipe 12 which extends at the level of the base of the air-conditioner 2 on the roof of the cab and returns to the tank.

Such a draining device loses its sealing qualities as soon as the cab reaches an extreme inclination in static operation and even well before this position when it is subjected to jerks due to the operation of the machine which has for effect to create waves in the pan. In this case, the water overflows the pan, runs along the roof and inside air-conditioner and flows into the element 3. FIG. 2 diagrammatically represents the limit static angle of inclination.

Moreover, this arrangement implies a fan of the helical type whose placement downstream of the humidification zone causes it to operate in the saturated surroundings/which has an adverse effect on the life of the motor. Further, this device results in apparatus of large size the height of which is sometimes prohibitive when the machines or vehicles must be able to pass under obstacles.

There has been proposed the utilisation of a centrifugal fan mounted at the inlet of the air-conditioner, but such a construction encounters the difficulty of the obtainment in this case of a mist of water and of a prolonged contact between the air and the water so that the efficiency of the air-conditioner is low.

An object of the present invention is to overcome these drawbacks by means of an air-conditioner which not only remains sealed against leakages notwithstanding high inclinations and considerable jerking of the machines, but ensures in the evaporation chamber an effective exchange between the air and the mist of water with the use of a fan mounted on the upstream side.

The invention consequently provides an air-conditioner comprising a case provided, at one end, with an inlet for the air to be treated and, at its opposite end, with a treated air outlet, an evaporation chamber within said case, means for propelling the air in the case and means for supplying water, in which the evaporation chamber comprises at least one propelled air inlet orifice which is relatively small and calibrated and, in the vicinity of said orifice, means for forming a mist of water which encounters the stream of accelerated air issuing from the orifice but is maintained spaced away from the orifice by said stream of air.

In such an air-conditioner, the inlet orifice is calibrated, i.e. sized, in such manner that the speed of the air stream passing through each calibrated orifice is such that it renders impossible any passage of counter-current fluid by way of this orifice, irrespective of the inclination of the assembly. On the other hand, the air and the water mist are driven in a whirling movement which ensures an efficient exchange in the evaporation chamber.

The propelling means may be constituted by one or more centrifugal or helical fans and are in any case positioned upstream of the case so that they operate in a dry atmosphere.

According to another feature of the invention, a deflector housing separates the air inlet in the case from the evaporation chamber and the calibrated orifices are formed in this housing.

Further, the case forms in its lower part below the calibrated orifices and the air outlet, a pan for recovering the condensed water which is continuously drained off by means of a drain.

In one embodiment, the water is sprayed in the chamber by means of nozzles each of which is mounted in the vicinity of a lateral calibrated air inlet orifice of the housing.

FIGS. 3 to 11 of the accompanying drawings illustrate, by way of example, an embodiment of the device according to the invention.

FIGS. 7 and 8 are diagrammatic views of two modifications of the installation of the air-conditioner on the roof of a cab.

FIG. 9 is a side elevational view of an air-conditioner mounted in a vertical position.

FIGS. 10 and 11 are diagrammatic/views of other manners of mounting the air-conditioner on the roof of a cab.

Figure 1:
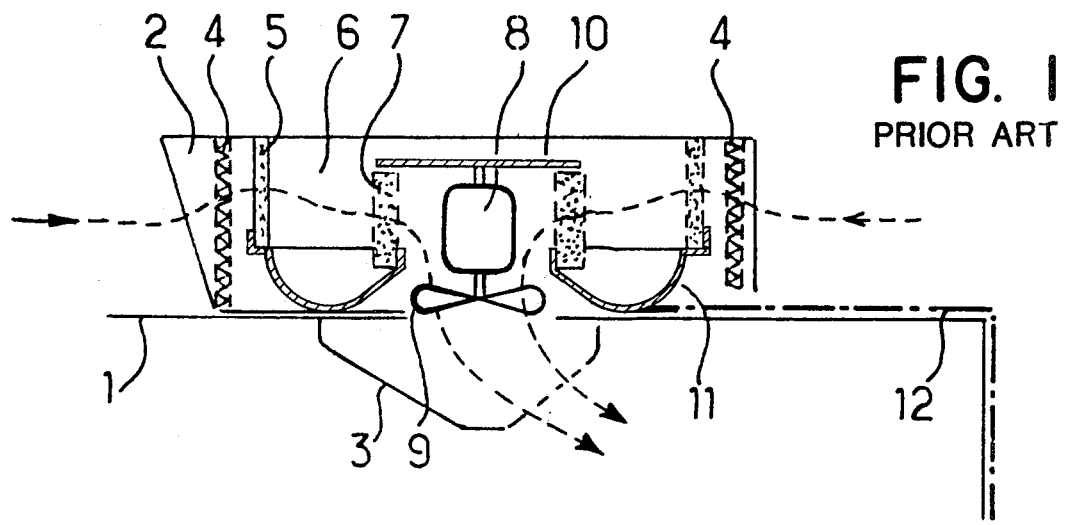
Figure 2:
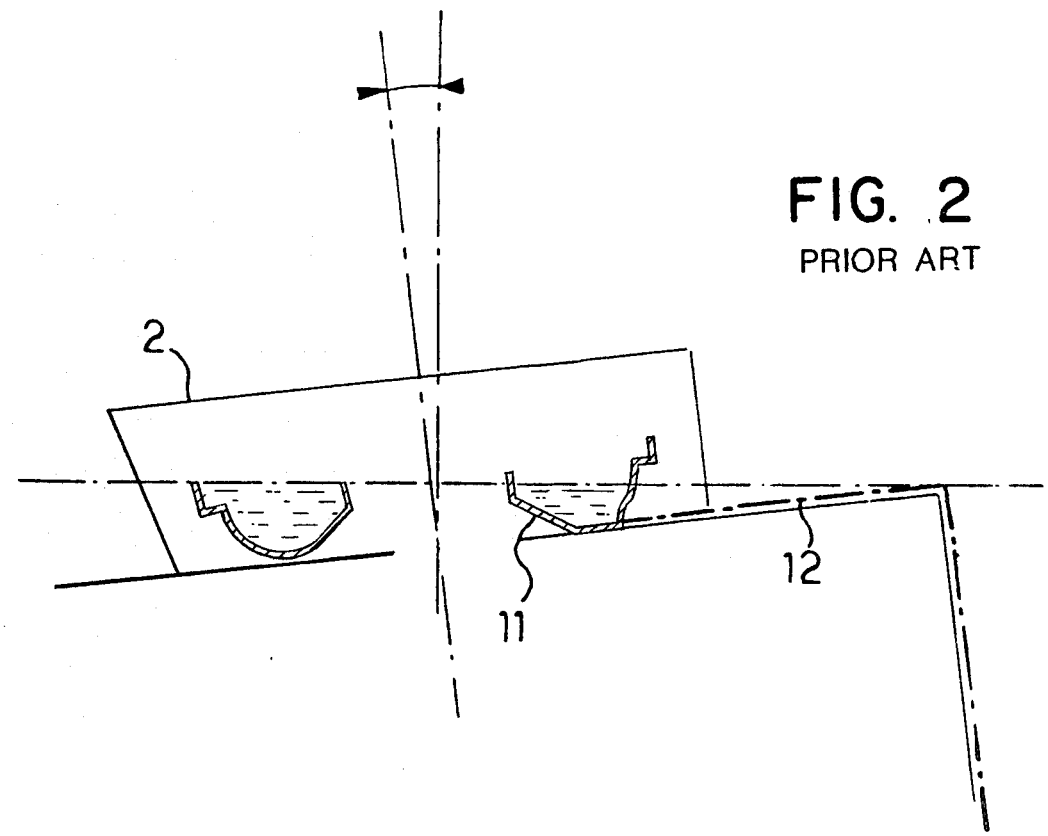
Figure 3:
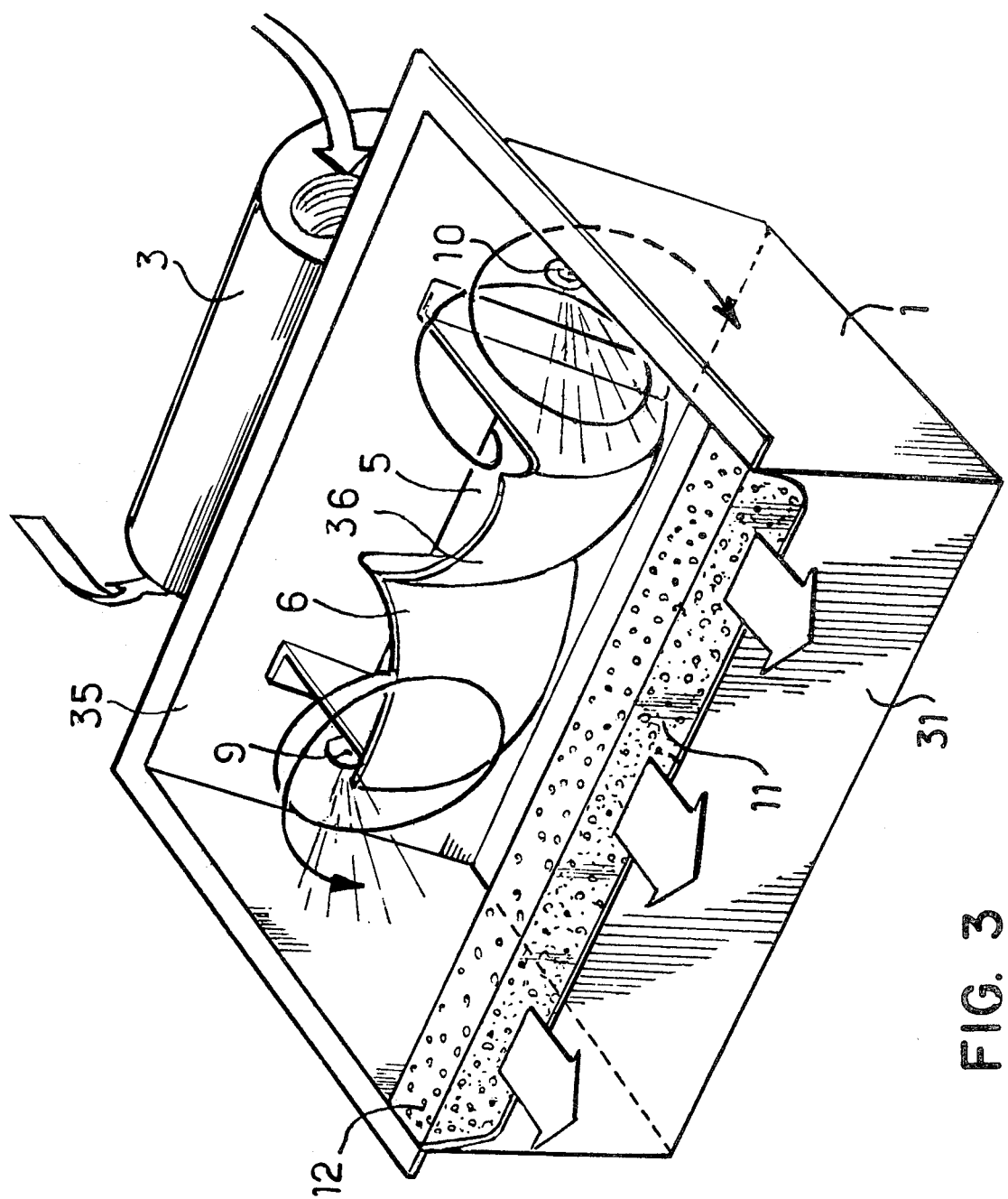
FIG. 3 is a perspective view of an air-conditioner according to the invention, the cover of which has been removed.
Figure 4:
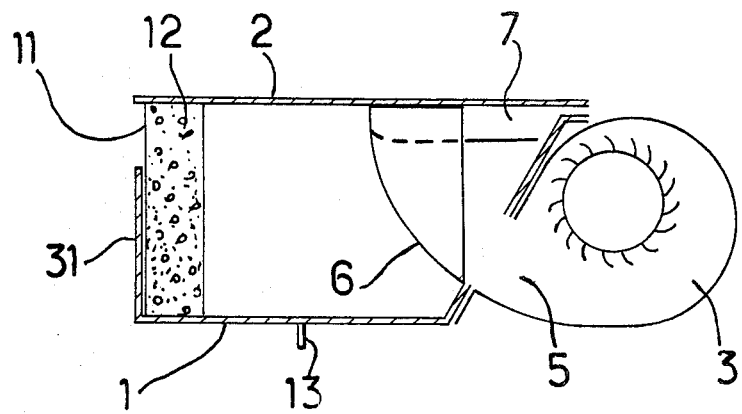
FIG. 4 is a sectional view taken on line A—A of FIG. 6.
Figure 5:
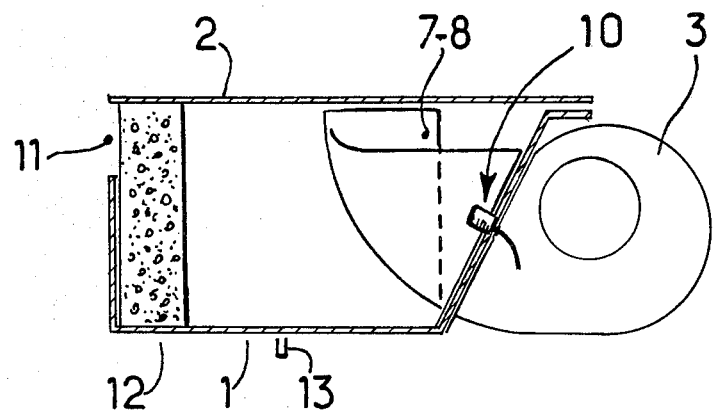
FIG. 5 is a sectional view taken on line B—B of FIG. 6.
Figure 6:
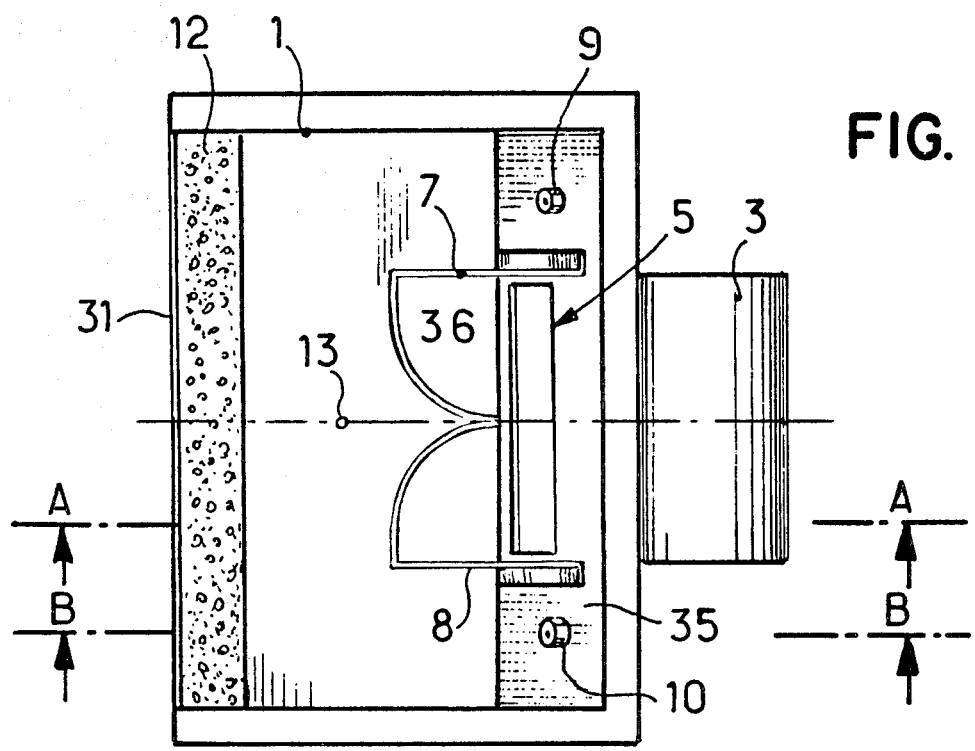
FIG. 6 is a plan view of the air-conditioner whose cover has been removed and is shown in FIG. 3.

As shown in the drawings, the device comprises a case formed by a container 1 and its cover 2. A turbofan unit 3 fixed to the outer wall of this container constitutes blowing means blowing the air to be treated into the container through an opening 5. Partition wall means in the form of a deflector case 6, which is assembled in a sealed manner inside the container in front of the opening 5 and provided with calibrated lateral orifices 7 and 8 communicating with the container, constitutes a distribution box at the entrance of the evaporation chamber formed by the rest of the container. On each side of this box there is mounted a spray nozzle 9, 10 connected to a conventional water supply comprising in particular a water tank and a pump (not shown) mounted on the machine or vehicle. The nozzles 9 and 10 are supported by the wall 35 which has the air inlet opening 5 and extend in a direction approximately parallel to the calibrated orifices 7 and 8 respectively, so that the water mist issuing from each nozzle has a general direction perpendicular to the stream of air which issues from the calibrated orifices as shown by the arrows in FIG. 3. Preferably, the wall 36 of the deflector case 6 which faces the opening 5 has a curved shape, its concavity facing toward this opening. It may thus form a portion of a cylinder whose generatrix is parallel to this opening or, as shown in FIG. 3, it may also be curved in its median part in the direction of this opening and form two deflector elements of inverted direction which guide the air toward the two opposed orifices 7 and 8 of the case. The distribution box thus performs three functions: firstly, it deviates the air stream received from the fan and straightens it by directing it on each side, against the jets of sprayed water issuing from the nozzles 9 and 10; second, its ensures a seal against the rising of the water mist toward the upstream end, which mist cannot pass through the zones of the calibrated orifices 7 and 8 where the speed of the air is maximum; third, it reconstitutes the partition wall of the container 1 and prevents the flow of condensed water through the opening 5, even in the case of considerable jerking. The mixing of air and water thus achieved in the container, which constitutes an evaporation chamber, facilitates the phenomenon of evaporation until its saturation, which is accompanied by a cooling of the treated air.

Before escaping from the container 1 by way of an opening 11 formed in the upper part of the wall 31 of the container opposite the wall 35, the stream of air passes through a medium for separating droplets 12.

This medium of cellular, porous, fibrous or spongy air-permeable material, covers the whole of the inner surface of the wall 31 and ensures an intimate contact of the air and water which is condensed and trickles toward the bottom. The part of the container located below the calibrated orifices performs the function of a pan for recovering the condensed water, but this water received at the bottom of the container is continuously drained off by a drain 13 and returned to the tank and to the supply pump.

In one application of the invention shown in FIG. 7, the cover 2 of the chamber corresponds with the roof 14 of the cab. The assembly is installed in a bracket 15. The air to be treated is taken off by way of a filter 16, circulates laterally between the air-conditioner and the bracket and reaches the turbo-fan; it is expelled after treatment, via a guide 17 toward diffusion ports 18.

According to another modification of the invention shown in FIG. 8, the cover 12 still corresponds with the roof 14, but the air-conditioner is installed in a position which is inverted relative to the preceding position. In this case, the seal is achieved between the air-conditioner and the bracket by a sealing element 19 so as to prevent the recycling.

According to another modification of the invention shown in FIG. 9, the air-conditioner is installed in a vertical position along the wall of the cab. The cover 2 can then also perform the function of cladding of the assembly and provide the air-conditioner with a case on its front and sides. The water return drain is located at the lowermost point 13 of the evaporation chamber in this configuration, the calibrated orifices 7 and 8 being limited to the upper part of the lateral wall of the box 6.

In another embodiment of the invention shown in FIG. 10, the cover 2 is arranged in such manner as to clad the device on its upper and lateral sides and to carry a suction filter 20. The compact assembly thus obtained is directly installed on the roof 14 of the cab. The treated air is then pumped into the cab through an opening opening onto a bracket 21 carrying the controls and the diffusers 18. A sealed partition wall 29, located between the body and the evaporation chamber or container, separates the suction and discharge zones.

In another embodiment of the invention shown in FIG. 11, the cover 2 is arranged as before. The body thus obtained is assembled on its periphery with a bracket 22 carrying the controls and the nozzles 18. A sealed partition wall 29 prevents the recycling of the air. The compact single-unit assembly thus obtained constitutes an air-conditioner which is ready to be installed directly in the opening of roofs which have a ventilation or safety trap. The unit can be in this case fixed by clamping by means of a cross-member 23 which bears under the edges of the opening inside the cab and assembled by screws 24 with the air-conditioner unit whose bracket 22 carries nuts 25.

The device according to the invention may be employed whenever it is desired to lower the ambient temperature of a compartment or a cab or to humidify the atmosphere, or both, so as to improve the comfort. These results are obtained without the requirement of a compressor or a refrigerating circuit. Its design enables it to operate correctly even with a high inclination or considerable jerking.

Indeed, the turbo-fan, which may be replaced without inconvenience by one or more helical or like fans, is not only mounted upstream of the unit and operates in a dry atmosphere but may be closely mounted on one end of the case, which permits the construction of an air-conditioner of small volume. The evaporation chamber is rendered much more compact and the decrease in its dimensions, associated with the placement of a drain having an immediate vertical descent, prevents the condensed water from sejourning in the unit and consequently producing large waves. As, moreover, the calibrated orifices are located in the upper part of the deflector housing, the limit angle for the overflow of the water at rest is considerably increased. The risk of overflow of the water is still further reduced and even practically eliminated by the fact that the calibrated orifices are relatively small and the air streams which issue therefrom have thus sufficient speed to constitute an anti-return barrier which opposes the passage of the water mist or the condensed water by way of these orifices.

Further, the compactness of the chamber-fan assembly enables the height of the air-conditioner to be reduced.

The water mist may of course be formed by means other than nozzles, for example by one or more rotary discs associated with water supply pipes. The number of calibrated orifices and nozzles, discs or other means and their relative positions may vary in accordance with the application of the air-conditioner. Whatever they may be, these means for forming the water mist are advantageously controlled by the control of the fan so as to prevent their operation when the latter has stopped.

If desired, a spongy material having intercommunicating open cells may be disposed at the bottom of the container so as to stabilize the surface of the water.

Particularly interesting applications will be possible for the air-conditioning of the cabs of agricultural, public works, handling, mines, building site, cross-country machines or vehicles, such as tractors, harvester-threshers, shovellers, loaders and aerodrome machines.

Having now described my invention, what I claim as new and desire to secure by Letters Patent is:

1. An air-conditioner employing the evaporation of water for cabs of machines, vehicles or the like, comprising a case, means defining a lateral inlet for the air to be treated at one lateral end of the case, and means defining an outlet for the treated air at an opposite end of the case, watertight partition wall means defining an evaporation chamber inside the case and extending up from the bottom of the case for sealing off said inlet from any water which might accumulate in the bottom of the evaporation chamber, means for blowing the air in the case and connected to said inlet, the watertight partition wall means defining at least one blown air inlet orifice which is spaced upwardly away from the bottom of the evaporation chamber and communicates with said inlet, means for connection to a water supply for forming a water mist, which mist-forming means are disposed in the vicinity of and below said orifice and on a side of said partition wall means remote from said inlet so that the mist is encountered by a stream of air issuing from said orifice, said orifice being calibrated at such size relative to the rate of flow of air from the air blown by the blowing means through said inlet that the air stream which issues from the orifice has sufficient speed to constitute an anti-return barrier which opposes the passage of the mist of water back through said orifice toward said air blowing means, and draining means for ensuring that water does not accumulate and stay in the bottom of the evaporation chamber.

2. An air-conditioner as claimed in claim 1, wherein a plurality of said calibrated orifices are provided.

3. An air-conditioner as claimed in claim 2, wherein said partition wall means comprise a deflector housing mounted in the case between the air inlet and the evaporation chamber, the calibrated orifices being provided in said housing at points remote from the air inlet.

4. An air-conditioner as claimed in claim 3, wherein the calibrated orifices are formed in an upper part of the deflector housing and the case defines a pan for collecting any condensed water which might accumulate below said orifices.

5. An air-conditioner as claimed in claim 3, comprising a curved wall which has a concavity facing the inlet and defines the deflector housing in front of the inlet.

6. An air-conditioner as claimed in any one of the claims 1, 2, 3, 4 or 5, wherein the air outlet is formed in an upper part of a wall of the case opposed to the air inlet.

7. An air-conditioner as claimed in any one of the claims 1, 2, 3, 4 or 5, comprising, within the case adjacent the outlet, a structure of cellular air permeable material, which ensures an intimate contact between air and water and forms a droplet separator.

8. An air-conditioner as claimed in any one of the claims 1, 2, 3, 4 or 5, comprising, within the case adjacent the outlet, a structure of porous air permeable material, which ensures an intimate contact between air and water and forms a droplet separator.

9. An air-conditioner as claimed in any one of the claims 1, 2, 3, 4 or 5, comprising, within the case adjacent the outlet, a structure of fibrous air permeable material, which ensures an intimate contact between air and water and forms a droplet separator.

10. An air-conditioner as claimed in any one of the claims 1, 2, 3, 4 or 5, comprising, within the case adjacent the outlet, a structure of spongy air permeable material, which ensures an intimate contact between air and water and forms a droplet separator.

11. An air-conditioner as claimed in any one of the claims 1, 2, 3, 4 or 5, wherein a lower part of the case defines a water collecting pan and said draining means comprise at least one drain pipe which communicates with the pan.

12. An air-conditioner as claimed in any one of the claims 1, 2, 3 or 4, wherein the inlets and the outlets are provided in two lateral opposed walls of the case and the air blowing means comprise a fan mounted against the wall of the case which is provided with the inlet.

13. An air-conditioner as claimed in any one of the claims 1, 2, 3, 4 or 5, wherein the inlet and outlet are respectively formed in lower and upper walls of the case and the air blowing means comprise an air blowing fan mounted below the inlet and the blown air flows in a rising current.

14. An air-conditioner as claimed in any one of the claims 3, 4 or 5, wherein the calibrated orifices are provided in two opposed lateral walls of the housing, and the mist-forming means comprise a spray nozzle which is mounted on each side of said housing.

15. An air-conditioner as claimed in any one of the claims 2, 3, 4 or 5, wherein the means for forming a water mist comprise at least one rotary disc associated with a water supply pipe.

16. An air-conditioner as claimed in any one of the claims 1, 2, 3, 4 or 5, wherein the means for forming a water mist comprise at least one spray nozzle for the respective calibrated orifice.

* * * * *